US 7,043,748 B2

(12) United States Patent
Thornton et al.

(10) Patent No.: US 7,043,748 B2
(45) Date of Patent: May 9, 2006

(54) COMPUTER NETWORK COMPRISING COMPUTING SYSTEMS WITH REMOTELY LOCATED HUMAN INTERFACES

(75) Inventors: Barry Thornton, Austin, TX (US);
Andrew Heller, Austin, TX (US);
Daniel Barrett, Austin, TX (US);
Charles Ely, Horseshoe Bay, TX (US)

(73) Assignee: ClearCube Technology, Inc., Austin, TX (US)

( * ) Notice: Subject to any disclaimer, the term of this patent is extended or adjusted under 35 U.S.C. 154(b) by 1068 days.

(21) Appl. No.: 09/755,378

(22) Filed: Jan. 5, 2001

(65) Prior Publication Data

US 2002/0059639 A1  May 16, 2002

Related U.S. Application Data

(63) Continuation of application No. 09/524,812, filed on Mar. 14, 2000, now Pat. No. 6,385,666, which is a continuation of application No. 09/072,320, filed on May 4, 1998, now Pat. No. 6,038,616.

(60) Provisional application No. 60/069,464, filed on Dec. 15, 1997.

(51) Int. Cl.
*H04N 7/18* (2006.01)
(52) U.S. Cl. .................. 725/78; 725/80; 725/82; 709/217; 709/219
(58) Field of Classification Search ............ 725/78–82, 725/87–91; 709/217–219
See application file for complete search history.

(56) References Cited

U.S. PATENT DOCUMENTS

| 3,725,866 A | 4/1973 | Oldfield et al. |
| 4,484,306 A | 11/1984 | Kulczyckyj et al. |
| 4,688,246 A | 8/1987 | Eilers et al. |
| 4,885,718 A | 12/1989 | Asprey et al. |
| 5,150,243 A | 9/1992 | Suzuki |
| 5,257,390 A | 10/1993 | Asprey |
| 5,268,676 A | 12/1993 | Asprey et al. |
| 5,337,413 A | 8/1994 | Lui et al. |
| 5,347,167 A | 9/1994 | Singh |

(Continued)

*Primary Examiner*—Chris Kelley
*Assistant Examiner*—Annan Q. Shang
(74) *Attorney, Agent, or Firm*—Meyertons Hood Kivlin Kowert & Goetzel, P.C.; Jeffrey C. Hood; Mark S. Williams

(57) ABSTRACT

A computer network comprising a plurality of nodes, each coupled to a DTE device comprising a computing system and a remotely located human interface, which includes a display and at least one I/O device. The DTE device computing systems are commonly located. Each DTE device includes an encoder coupled to the computing system, a decoder coupled to the display and the at least one I/O device, and a transmission line coupling the encoder and the decoder. The encoder receives, from the computing system, a video signal for transmission to the display and a non-video signal for transmission to the at least one I/O device, encodes the video and the non-video signals, and transmits the encoded signals to the decoder via the transmission line. The decoder receives the encoded signals, and decodes the video and non-video signals therefrom for respective propagation to the display and the at least one I/O device.

128 Claims, 4 Drawing Sheets

U.S. PATENT DOCUMENTS

| | | | |
|---|---|---|---|
| 5,353,409 A | 10/1994 | Asprey et al. | |
| 5,428,806 A | 6/1995 | Pocrass | |
| 5,479,617 A | 12/1995 | Nei | |
| 5,499,377 A | 3/1996 | Lee | |
| 5,500,794 A * | 3/1996 | Fujita et al. | 700/83 |
| 5,537,104 A * | 7/1996 | Van Dort et al. | 340/825.52 |
| 5,541,670 A * | 7/1996 | Hanai | 348/705 |
| 5,550,593 A | 8/1996 | Nakabayashi | |
| 5,577,205 A | 11/1996 | Hwang et al. | |
| 5,598,401 A | 1/1997 | Blackwell et al. | |
| 5,623,304 A | 4/1997 | Ota et al. | |
| 5,675,811 A | 10/1997 | Broedner et al. | |
| 5,708,961 A * | 1/1998 | Hylton et al. | 725/81 |
| 5,715,410 A | 2/1998 | Kim | |
| 5,721,842 A | 2/1998 | Beasley et al. | |
| 5,734,834 A | 3/1998 | Yoneyama | |
| 5,801,689 A | 9/1998 | Huntsman | |
| 5,802,281 A | 9/1998 | Clapp et al. | |
| 5,831,608 A | 11/1998 | Janay et al. | |
| 5,875,246 A * | 2/1999 | Houghton | 379/406.05 |
| 5,878,271 A | 3/1999 | Crump et al. | |
| 5,884,096 A | 3/1999 | Beasley et al. | |
| 5,907,548 A * | 5/1999 | Bernstein | 370/353 |
| 5,922,047 A * | 7/1999 | Newlin et al. | 709/217 |
| 5,926,172 A | 7/1999 | Hanley | |
| 5,926,509 A | 7/1999 | Stewart et al. | |
| 5,945,631 A * | 8/1999 | Henrikson et al. | 174/34 |
| 5,948,092 A | 9/1999 | Crump et al. | |
| 5,966,056 A | 10/1999 | Thornton | |
| 6,006,256 A | 12/1999 | Zdepski et al. | |
| 6,012,101 A | 1/2000 | Heller et al. | |
| 6,026,150 A * | 2/2000 | Frank et al. | 379/90.01 |
| 6,038,616 A | 3/2000 | Heller et al. | |
| RE36,707 E * | 5/2000 | Papanicolaou et al. | 348/14 |
| 6,078,974 A | 6/2000 | Kirshtein | |
| 6,081,519 A * | 6/2000 | Petler | 370/356 |
| 6,088,368 A * | 7/2000 | Rubinstain et al. | 370/480 |
| 6,119,146 A | 9/2000 | Heller et al. | |
| 6,130,893 A * | 10/2000 | Whittaker et al. | 370/420 |
| 6,141,356 A * | 10/2000 | Gorman | 370/493 |
| 6,185,643 B1 | 2/2001 | Kirshtein et al. | |
| 6,310,286 B1 * | 10/2001 | Troxel et al. | 174/36 |
| 6,311,231 B1 * | 10/2001 | Bateman et al. | 379/265.09 |
| 6,381,666 B1 | 4/2002 | Kejser et al. | |
| 6,493,874 B1 * | 12/2002 | Humpleman | 725/78 |
| 6,603,488 B1 * | 8/2003 | Humpleman et al. | 715/771 |
| 2005/0010866 A1 * | 1/2005 | Humpleman et al. | 715/513 |

* cited by examiner

COMPUTER NETWORK COMPRISING COMPUTING SYSTEMS WITH REMOTELY LOCATED HUMAN INTERFACES

CONTINUATION INFORMATION

This application is a continuation of U.S. application Ser. No. 09/524,812 entitled COMPUTER SYSTEM HAVING REMOTELY LOCATED I/O DEVICES, filed on Mar. 14, 2000, now U.S. Pat. No. 6,385,666 and whose inventors are Barry Thornton, Andrew Heller, Daniel Barrett, and Charles Ely, which is a continuation of Ser. No. 09/072,320 filed on May 4, 1998, now U.S. Pat. No. 6,038,616 entitled COMPUTER SYSTEM WITH REMOTELY LOCATED INTERFACE WHERE SIGNALS ARE ENCODED AT THE COMPUTER SYSTEM, TRANSFERRED THROUGH A 4-WIRE CABLE, AND DECODED AT THE INTERFACE, which issued on Mar. 14, 2000, and whose inventors are Andrew Heller, Barry Thornton, Daniel Barrett, and Charles Ely, and which claims benefit of U.S. Provisional. Patent application Ser. No. 60/069,464, filed on Dec. 15, 1997.

FIELD OF THE INVENTION

The invention relates generally to computer networks and, more particularly, to a computer network which includes plural commonly located computing systems as a portion thereof.

DESCRIPTION OF THE RELATED ART

In its broadest sense, a computer network is a set of nodes and communication channels which interconnect the set of nodes. The nodes may be computers, terminals, workstations, or communication units of various kinds and may be distributed at different locations. They communicate over the communication channels which are provided by the owner of the computer network or leased from a common carrier. These communication channels may use a variety of transmission media such as optical fibers, coaxial cable or twisted copper pairs. A local area network (or "LAN") is a computer network at a single site and, in many cases, is confined to a single building. A wide area network (or "WAN") is a computer network that uses either a public or private switching system to interconnect computers located at plural sites which may be separated by hundreds or thousands of miles.

There are a number of advantages to constructing a computer network. They include resource and data sharing, and communication and data exchange. Resource sharing provides users with convenient access to special computing resources, regardless of their physical location. Data sharing provides users with access to common databases. Data exchanges enable users to exchange data files while communication exchanges enable users to exchange messages, for example, via electronic mail (or "E-mail"). While networks may be arranged in a variety of configurations, a commonly used network design has a bus (also known as a "linear") topology in which a single network cable is routed through those locations where a data terminal equipment (or "DTE") device is to be connected to the network. At each of these locations, a physical connection (or "tap") is made to the cable to allow the DTE at that location to access the network. At selected nodes of such a network, file servers or other large scale computer systems provide network services while, at others of the nodes, individual workstations, each typically comprised of a personal computer (or "PC"), desktop computer, or other type of physically compact computer system capable of both operating as a standalone computer and accessing the network services, reside.

The components of PCs (as well as all other computer systems, including minicomputers and mainframes), may be divided into two functional units—the computing system and the human interface (or "HI") to the computing system For a PC, the computing system is, quite simply, the chassis which holds the motherboard, power supply, hard drive and the like. The human interface, on the other hand, are those devices that humans use to transfer information to and/or receive information from the computing system. The most commonly recognized devices which form part of the human interface with the computing system include the monitor, keyboard, mouse and printer. Of course, a variety of other devices, for example, a joystick, trackball, touchpad or others too numerous to specifically mention, may form part of the human interface. For most PCs installed at workstations, the computer monitor, keyboard and mouse rest on the desktop while the computer chassis which holds the computing system rests on the floor underneath the desktop.

While the above-described network configuration is quite common in many business establishments, recently, a number of issues, in particular, security concerns, have been raised in connection with such network designs. Business contacts, vendor information, contracts, reports, compilations, proprietary software, access codes, protocols, correspondence, account records, business plans are just some of the fundamental assets of a company which are oftentimes accessible from an employee's computer where it can be quickly copied onto a floppy disk and stolen.

Disk and CD drives may also be used to introduce illegal, inappropriate or dangerous software to a computer. Storing bootlegged software can expose a company to copyright infringement claims. Computer games often reduce employee productivity. If imported onto a computer system, computer pornography may create a hostile work environment which leads to a sexual discrimination lawsuit against the company. Computer viruses can cause the loss of critical information stored on a computer. Finally, the computing system itself may be damaged or otherwise misconfigured when left accessible to technically oriented employees who take it upon themselves to attempt to repair and/or modify the computer system.

Another concern often raised in connection with the present practice of placing the computer system at the desktop is that such workstation designs actual work against proper maintenance of the computing system. When placed underneath the desktop, computing systems are often forced to absorb physical shocks when accidentally kicked, knocked over or struck by falling objects, any of which could result in damage to the various electronic components, located within the chassis, which comprises the computing system. Oftentimes, a computing system is placed in a "convenient" location and not in a location designed to keep it cool. A computer system typically includes a cyclonic fan designed to direct a constant flow of cooling area at the heat-generating components of the computing system. However, if a barrier is placed a few inches in front of the fan intake, the efficiency of the fan is reduced dramatically. Similarly, placing the computer system against a wall or running cables in front of the fan adversely affects the ability of the fan to properly cool the computing system. Finally, even in relatively clean office environments, the fan tends to draw in dirt and other dust particles into the interior of the computer chassis where they are deposited on the heat-generating electronic components which comprise the computing system. As dust tends to insulate the components on which it is deposited, the ability of such components to dissipate heat becomes degraded when a layer of dust collects on the component.

Logistical support, too, becomes a vexing problem for computer-intensive organizations when computing systems are scattered throughout a facility. When machine failures occur, the repair person must go to the machine to diagnose and repair the machine. Oftentimes, this entails multiple visits to the machine's location, particularly when the first examination reveals that replacement parts or a replacement machine are needed. Similarly, software upgrades and other performance checks become quite time-consuming tasks when personnel must travel to each machine where the software resides locally.

Finally, many office buildings were designed before the advent of the age of the PC. As a single PC can consume over 300 watts of power, a heavily computerized workplace could potentially demand power in excess of the amount available. Similarly, the heat generated by the large number of computers installed in modem workplaces can easily overwhelm the air conditioning capacity of a building's HVAC system, thereby causing room temperatures to rise above those levels preferred by the occupants of the building.

These concerns have been driving the development of the network computer (or "NC") and other so-called "thin" computer solutions. While various NC designs have been proposed, most entail removal of the auxiliary memory (also known as the hard drive) and substantially reducing the size of the processor. All software applications and data files would be stored on the network and the NC would be limited to accesses of network software and data files. Most NC designs also propose that all disk drives (typically, the CD and floppy drives) be removed, thereby eliminating the ability of the NC user to import or export software applications and/or data files.

The development of the NC is, in part due to a recognition by the computer industry of security and other problems which have arisen due to the evolution of computer networks into their present configuration. However, the NC is not a fully satisfactory solution to these problems. While removing much of the processing capability from the workstation, most NC designs propose leaving sufficient intelligence at the workstation to access the internet, load software applications retrieved from the network memory and perform other operations. Thus, while reduced in complexity, NCs will still have maintenance, power and cooling concerns. Thus, while the NC represents a step in the right direction, many of the aforementioned issues cannot be resolved by wide-scale implementation of NCs.

In order to fully resolve the aforementioned issues, the entire computing system needs to be physically separated from the human interface, specifically, by keeping the human interface (monitor, keyboard, mouse and printer) at the workstation while relocating the associated computing system (chassis holding the motherboard, power supply, memory, disk drives, etc.) to a secured computer room where plural computing systems are maintained. By securing the computing systems in one room, the employer's control over the computer systems would be greatly enhanced. For example, since employees would no longer have personal access, through the floppy or CD drive, to the memory subsystem, employees could not surreptitiously remove information from their computing system. Nor could the employee independently load software or other data files onto their computing system. Similarly, the employee could no longer physically change settings or otherwise modify the hardware portion of the computer. Maintenance would be greatly facilitated by placement of all of the computing systems in a common room. For example, the repair technicians and their equipment could be stationed in the same room with all of the computing systems. Thus, a technician could replace failed components or even swap out the entire unit without making repeated trips to the location of the malfunctioning machine. Such a room could be provided with special HVAC and power systems to ensure that the room is kept clean, cool and fully powered.

Therefore, what is needed is a computer network comprised of plural computers, each configured such that a human interface portion thereof is remotely located relative to a computing system portion thereof, in which plural computing systems are located at a common location.

SUMMARY OF THE INVENTION

In one embodiment, the present invention is of a computer network comprised of a plurality of interconnected nodes, each having a DTE device coupled thereto. At least one, and preferably, plural ones, of the DTE devices are each further comprised of a computing system positioned at a first location, preferably common to the plural computing systems, and a human interface positioned at a second location remotely located relative to the first location. A 4-wire cable couples first and second interface devices which, in turn, are respectively coupled to the computing system and the human interface. The first interface device converts signals generated by the computing system into a format suitable for transmission to the second interface device while the second interface device converts signals, received from the first interface device into a format suitable for transmission to the human interface. In alternate aspects thereof, the computer network may further include a cable, preferably, a thin wire coaxial cable, for interconnecting the plural nodes, the computing system may be a computer chassis and at least one computing system component housed therein and coupled to the first interface device and the human interface may be a video monitor, printer, keyboard or mouse coupled to the second interface device.

In another embodiment, the present invention is of a computer network comprised of a plurality of interconnected nodes, each having a DTE device coupled thereto. At least one, and preferably, plural ones, of the DTE devices are each further comprised of a computing system positioned at a first location, preferably common to the plural computing systems, and a human interface, which includes a video monitor and at least one I/O device, positioned at a second location remotely located relative to the first location. The DTE device further includes a first encoder coupled to the computing system, a first decoder coupled to the video monitor and the at least one I/O device and a transmission line which couples the encoder to the decoder. The first encoder receives, from the computing system, a video signal to be transmitted to the video monitor and a non-video signal to be transmitted to the at least one I/O device. The first encoder combines the video and the non-video signals into a combined signal and transmits the combined signal to the first decoder via the transmission line. The first decoder receives the combined signal, separates the video and non-video signals therefrom for respective propagation to the video monitor and the at least one I/O device.

In one aspect thereof, the computer may further include a second encoder coupled to the computing system and the first encoder and a second decoder coupled to the first decoder and the I/O devices. The second encoder receives a first non-video signal to be transmitted to a first I/O device, a second non-video signal to be transmitted to a second I/O device and a third non-video signal to be transmitted to a third I/O device and combines the first, second and third non-video signals into the non-video signal. The second decoder receives the non-video signal from the first decoder and separates the first, second and third non-video signals therefrom for respective propagation to the first, second and third I/O devices. In a further aspect thereof, the first encoder may receive red ("R"), green ("G"), blue ("B"), horizontal synchronization ("HSYNC") and vertical synchronization ("VSYNC") video signals from the computing system, combine the R and HSYNC video signals into a combined signal for transmission to the first decoder, combine the B and VSYNC video signals into another combined signal for transmission to the first decoder and combine the G video signal and the non-video signal into the last combined signal for transmission to the first decoder.

In still another embodiment, the present invention is of a computer network comprised of a plurality of nodes, each having a DTE device coupled thereto, and a connective structure arranged, for example, in a bus topology, which interconnects the plural DTE devices into a computer network. The DTE device coupled to at least one, and preferably, plural ones, of the nodes, further comprises a computing system located at a first location, preferably common to the plural computing systems, for example, a shared computer room or a common support structure such as a rack, a human interface located at a second location, each remotely located relative to the first location and preferably remotely located relative to the other second locations, a first interface device coupled to the computing system, a second interface device coupled to a monitor and an I/O device of the human interface and a 4-wire cable coupling the first and second interface devices. An encoding circuit of the first interface device receives, from the computing system, plural video signals to be transmitted to the video monitor and a non-video output signal to be transmitted to the I/O device. The encoding circuit combines the non-video signal with a selected one of the plural video signals to produce a combined signal and transmits the combined signal over a selected pair of the transmission lines of the 4-wire cable. A decoding circuit of the second interface device receives the combined signal from the first interface device and separates the combined signal into the video signal to be transmitted to the video monitor and the non-video signal to be transmitted to the I/O device.

In one aspect thereof, an encoding circuit of the second interface device receives a non-video input signal from the I/O device and encodes the received signal for output onto a selected pair of the transmission lines for transfer to the first interface device. In another aspect thereof, a decoding circuit of the first interface device receives the non-video I/O input signal from the selected pair of transmission lines and decodes the non-video input signal for transmission to the computing system.

DETAILED DESCRIPTION OF THE INVENTION

Incorporation by Reference:

This application is related to U.S. Pat. No. 6,038,616 entitled COMPUTER SYSTEM WITH REMOTELY LOCATED INTERFACE WHERE SIGNALS ARE ENCODED AT THE COMPUTER SYSTEM, TRANSFERRED THROUGH A 4-WIRE CABLE, AND DECODED AT THE INTERFACE, which issued on Mar. 14, 2000, and whose inventors are Andrew Heller, Barry Thornton, Daniel Barrett, and Charles Ely, U.S. patent application Ser. No. 09/072,382 entitled METHOD FOR INCORPORATING COMPUTER DATA INTO AN ANALOG VIDEO STREAM AND AN ASSOCIATED COMPUTER SYSTEM HAVING REMOTELY LOCATED I/O DEVICES, and U.S. Pat. No. 6119,146 entitled COMPUTER NETWORK HAVING MULTIPLE REMOTELY LOCATED HUMAN INTERFACES SHARING A COMMON COMPUTING SYSTEM, which issued on Sep. 12, 2000, and whose inventors are Barry Thornton, Andrew Heller, Daniel Barrett, and Charles Ely, all of which were filed on May 4, 1998, assigned to the Assignee of the present application and are hereby incorporated by reference as if reproduced in their entirety.

Figure 1:
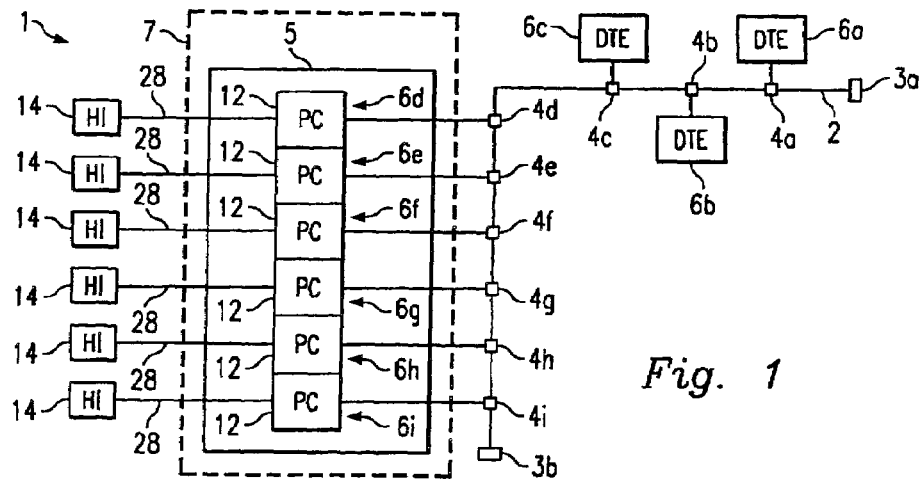
FIG. 1 is a block diagram of a computer network constructed in accordance with the teachings of the present invention.

Referring now to FIG. 1, a computer network 1 constructed in accordance with the teachings of the present invention will now be described in greater detail. The computer network 1 has a bus topology and is comprised of a network cable 2 which extends between terminators 3a and 3b. It should be noted, however, that ring, star, hub and other network topologies are equally suitable for use as the network topology. As illustrated herein, the network cable 2 is comprised of "thin wire" coaxial cable. It should be noted, however, that the transmission medium used for the network cable 2 will vary depending on the specific design of the computer network 1. If the network cable 2 can be kept shorter than 100 meters, it may be possible to use a twisted pair as the network cable 2. For greater distances, the network cable should be comprised of either thin wire or "thick wire" coaxial cable. Thin wire coaxial cable has a diameter of 0.25 inches, half that of thick wire coaxial cable. Thick wire cable also requires the use of additional wiring commonly known as "drop cable" and transmit and receive electronics between each tap on the main coaxial cable and the point of attachment to each workstation. As a result, therefore, thin wire coaxial cable is both easier to use and less expensive to install. However, as thin wire has much higher attenuation rates, it is often necessary to use thick wire cable for certain portions of the network cable 2, for example, when interconnecting thin-wire segments located in different areas of a building.

Spaced along the network cable 2 are a series of nodes 4a through 4i. At each node 4a through 4i, a physical connection couples a corresponding one of the DTE devices 6a through 6i to the network cable 2 such that the DTE devices 6a through 6i may access other portions of the computer network 1. In the embodiment of the invention disclosed herein, it is contemplated that each of the DTE devices 6a through 6c are file servers or other type of network resources while each of the DTE devices 6d through 6i are PCs, specifically PCs comprised of a computing system 12 coupled to a remotely located human interface 14. As further illustrated in FIG. 1, the computing systems 12 are commonly located. For example, the computing systems 12 may be mounted in a common support structure 5 such as a rack located in a room 7 shown in phantom in FIG. 1. As disclosed herein, the term "commonly located" computing systems shall mean computing systems which are positioned or otherwise located within 10 meters of each other. Furthermore, other types of support structures are equally suitable for the uses contemplated herein.

Various benefits are achieved by configuring the computer network 1 to include plural DTE devices, specifically the DTE devices 6d through 6i, each comprised of a commonly located computing system 12 for which the human interface 14 is remotely located relative to the corresponding computing system 12. Specifically, it is well appreciated in the art that the various DTE devices which comprise a computer network are typically geographically scattered throughout a building or other complex, thereby leading to the maintenance, repair and, if the users of the DTE devices have access to network facilities via a floppy drive or other device, security problems discussed herein. All of these problems may be readily eliminated by housing all of the computing systems 12 in one or more support structures 5 which, in turn, may be located in a secured, limited access computer room 7 specially designed to meet the power and cooling requirements for the collection of commonly located computing systems 12.

The computer network 1, itself, is much more compact (and much less geographically extensive) when the computing systems 12 for the DTE devices 6d through 6i are commonly located. Thus, ease of maintenance for the computer network 1 may be enhanced. Furthermore, the cabling requirements for the computer network 1 may be greatly simplified. For example, most computer networks will include sections which use the more expensive thick wire coaxial cable. If various ones of the DTE devices have commonly located computing systems, the length of cable needed to wire the computer network 1 will be reduced considerably and larger portions of the computer network 1 will be suited for thin wire coaxial cable. For example, if the DTE devices 6a through 6c (the file server and other network facilities) are housed in the same room as the DTE devices 6d through 6i having the commonly located computing systems 12, a thin wire coaxial cable may be suitable for use as the network cable 2 for the entire computer network 1. If so, the cost of installing the computer network 1 will be reduced substantially.

Figure 2:
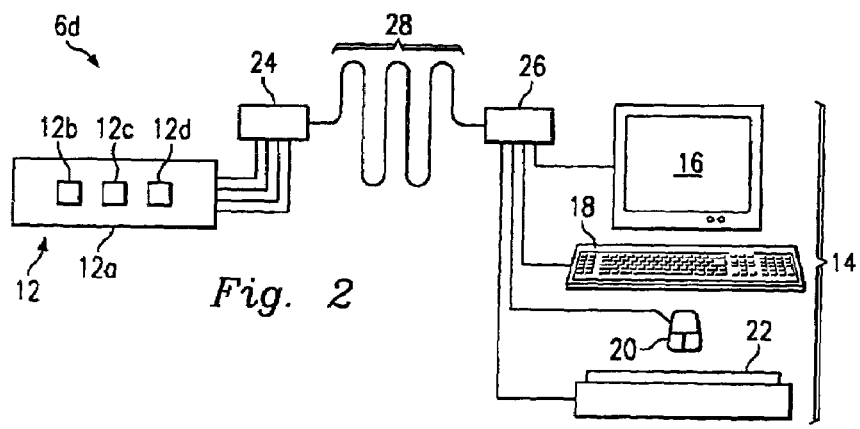
FIG. 2 is an expanded block diagram of a DTE forming part of the computer network of FIG. 1.

Referring next to FIG. 2, the computing system 12 and human interface 14 which, in combination, respectively comprise each of the DTE devices 6d through 6i may now be seen in greater detail. As may now be seen, the computing system 12 of each DTE device 6d through 6i is comprised of a computer chassis 12a, sometimes referred to as the "box" in which motherboard 12b, disk drive 12c, hard drive 12d, power supply (not shown) and other conventional components, are housed. As may now be further seen, the human interface 14 of each one of the DTE devices 6d through 6i is comprised of a monitor 16, a keyboard 18, a mouse 20 and a printer 22, all of which are conventional devices, the operation of which are well known. It should be clearly understood that the disclosed human interface 14 is given by way of example. Accordingly, it is fully contemplated that other input/output (or "I/O") devices, for example, a joystick, trackball, touchpad or other device may be included as part of the human interface 14. Generally, for inclusion in the human interface 14, an I/O device should require, at a minimum, some type of physical interaction with a human during the primary operation thereof. It should also be understood that not all I/O devices form part of the human interface. For example, the primary interaction which occurs during use of a floppy or CD drive is between the computing system and a physical medium inserted into the drive. Accordingly, floppy and CD drives are not part of the human interface 14.

In a conventionally configured computer system, the monitor 16, the keyboard 18, the mouse 20 and the printer 22 would be provided with a respective cable which terminates in a pin connectors which, when inserted into a matching plug connector provided on a rear side surface (or "backplane") of the computing system 12, couples the monitor 16, the keyboard 18, the mouse 20 and the printer 22 to the main system bus (not shown) which couples the various electronic devices (including, but not limited to the motherboard 12b, the disk drive 12c and the hard drive 12d) which comprises the computing system 12. Unlike the conventionally configured computer system, however, the monitor 16, the keyboard 18, the mouse 20 and the printer 22 are remotely located relative to the computing system 12. To enjoy the benefits of a remotely located human interface 14 as described herein, it is generally contemplated that the computing system 12 and the human interface 14 be located in separate rooms, which typically requires a minimum separation of at least 10 feet. It is specifically contemplated, however, that the computing system 12 and the human interface 14 may be located hundreds, or even thousands, of feet apart.

Thus, by the term "remotely located", it is intended to refer to separation distances greater than those possible using conventionally designed cables such as those provided when purchasing a PC. Accordingly, the term "remotely located", as used herein, generally refers to separation distances between 10 and 1,000 feet. However, as it is possible to utilize the disclosed techniques to separate the computing system 12 and the human interface 14 by distances greater than 1,000 feet, it should be clearly understood that the aforementioned upper limit of 1,000 feet is given by way of example and should not be construed as a limitation on the scope of the present invention.

To achieve the separation distances contemplated herein, an upstream extension interface 24 is coupled to the computing system 12 and a downstream extension interface 26 is coupled to the human interface 14. Generally, connector cables extending from the monitor 16, the keyboard 18, the mouse 20 and the printer 22 all plug into the downstream extension interface 26 in an manner identical to how those same cables would plug into the backplane of the computing system 12. Similarly, the cables extending from the upstream extension interface 24 identically plug into the backplane of the computing system 12 as would the cables from the monitor 16, the keyboard 18, the mouse 20 and the printer 22 plug thereinto. Finally, coupling the upstream extension interface 24 and the downstream extension interface 26 is a 4-wire cable 28 configured in the manner disclosed in co-pending U.S. patent application Ser. No. 08/674,626 filed Jul. 3, 1996 entitled "Method and Apparatus for Enabling the Transmission of Multiple Wide Band Width Electrical Signals, assigned to the Assignee of the present application and hereby incorporated by reference as if reproduced in its entirety.

Figure 3:
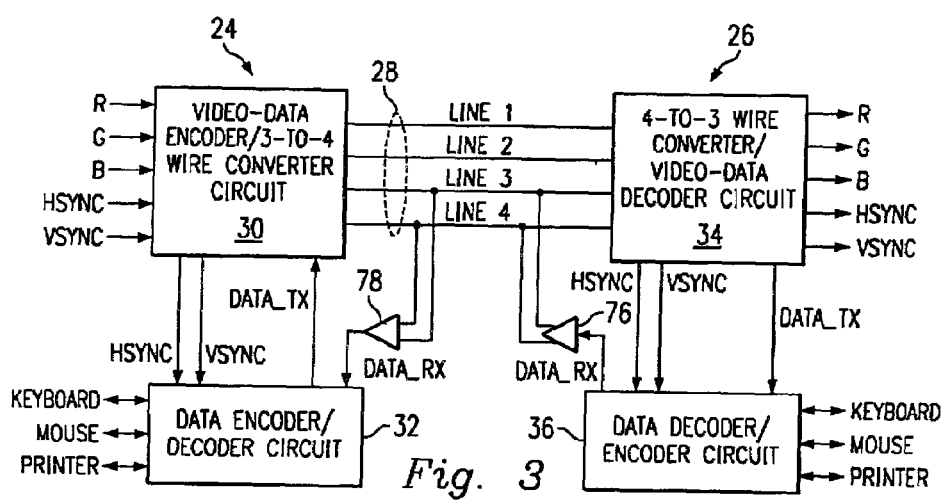
FIG. 3 is an expanded block diagram of upstream extension and downstream extension interfaces of the DTE of FIG. 2.

Referring next to FIG. 3, the upstream and downstream extension interfaces 24 and 26 will now be described in greater detail. As may now be seen, the upstream extension interface 24 is comprised of a video-data encoder/3-to-4 wire converter circuit 30 and a data encoder/decoder circuit 32. Similarly, the downstream extension interface 26 is comprised of a 4-to-3 wire converter/video-data decoder circuit 34 and a data decoder/encoder circuit 36. Broadly speaking, the video-data encoder/3-to-4 wire converter circuit 30 receives video signals output by the computing system 12 for transmission to the monitor 16, specifically, red (or "R"), green (or "G"), blue (or "B"), horizontal synchronization (or "HSYNC") and vertical synchronization (or "VSYNC") signals. The data encoder/decoder circuit 32, on the other hand, receives all signals output by the computing system 12 for transmission to the keyboard 18, the mouse 20 and the printer 22. The data encoder/decoder circuit 32 also receives the HSYNC and VSYNC signals from the video-data encoder/3-to-4 wire converter circuit 30 and, as will be more fully described below, uses the HSYNC and VSYNC signals to encode data received from the computing system 12 into a data signal DATA_TX for transmission to the video-data encoder/3-to-4 wire converter circuit 30.

Figure 4:
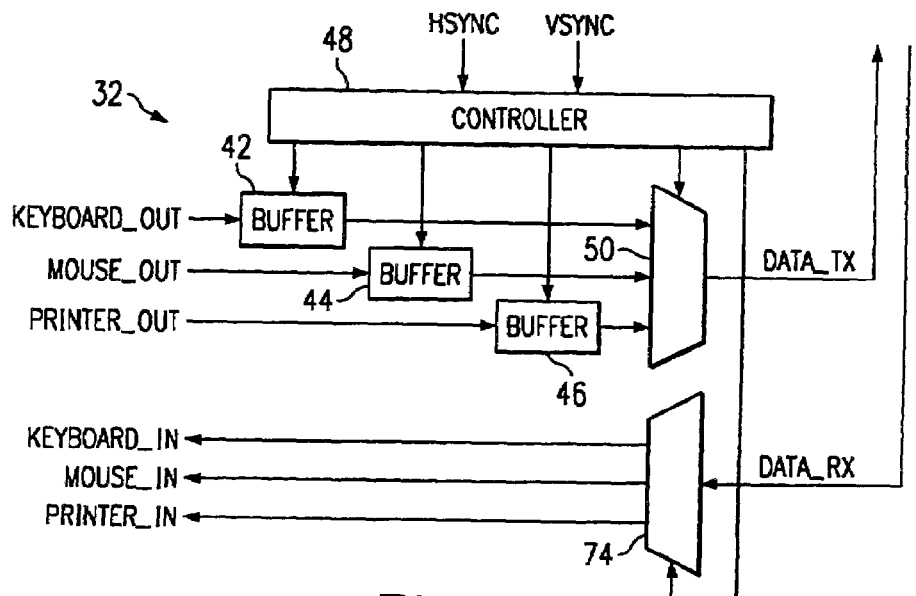
FIG. 4 is an expanded block diagram of a data encoder/decoder circuit of the upstream extension interface of FIG. 3.

Referring next to FIG. 4, operation of the data encoder/decoder circuit 32 in producing the data signal DATA_TX will now be described in greater detail. As is well known in the art, the computing system 12 generates signals to be transmitted to the various I/O devices included as part of the human interface 14. As shown here, the computing system 12 generates KEYBOARD_OUT, MOUSE_OUT and PRINTER_OUT signals for respective propagation to the keyboard 18, the mouse 20 and the printer 22. Each of the output signals KEYBOARD_OUT, MOUSE_OUT and PRINTER_OUT are propagated to a respective buffer 42, 44 and 46 where the received data is held temporarily. The buffers 42, 44 and 46 each include an output tied to a respective input of 3:1 multiplexer 50, the output of which is the DATA_TX signal. The buffers 42, 44 and 46 and the multiplexer 50 are controlled by a controller 48. Specifically, respective control outputs of the controller 48 are tied to a control input of each of the buffers 42, 44 and 46 and to a control input of the multiplexer 50.

The controller 48 times the propagation of the KEYBOARD_OUT, MOUSE_OUT and PRINTER_OUT signals such that the combined signal DATA_TX contains data only during the horizontal and vertical blanking pulses of the video signal being transmitted to the video-date encoder/3-to-4 wire converter circuit 30. To do so, the controller 48 receives the HSYNC and VSYNC signals from the video-data encoder/3-to4-wire converter circuit 30. The controller 48 counts the blanking pulses contained in the HSYNC and VSYNC signals, and, during each such blanking pulse of the HSYNC and VSYNC signals, enables a selected one of the buffers 42, 44 and 46 and enables the multiplexer 50 such that the data stored in the selected buffer 42, 44 or 46 is propagated to the video-data encoder/3-to-4 wire converter circuit 30 as part of the DATA_TX signal. For example, each time the video signal transmitted to the video-data encoder/3-to-4 wire converter circuit 30 completes a line of video data, the HSYNC signal will contain a blanking pulse. The number of lines required to generate an image that fills the screen of the video monitor 16 will vary, depending on the operating mode of the video monitor 16. In accordance with one such operating mode, 640 lines of video data are required to generate a image. Thus, for this operating mode, the HSYNC signal will blank 640 times. Each blanking pulse is assigned to an output signal destined for a particular I/O device. For example, during horizontal blanking pulses 1–25, the controller 48 propagates data received from the KEYBOARD_OUT line to the video-data encoder/3-to-4 wire converter circuit 30 by enabling the buffer 42 and the multiplexer 50. During horizontal blanking pulses 26–50, the controller 48 propagates data received from the MOUSE_OUT line to the video-data encoder/3-to-4 wire converter circuit 30 by enabling the buffer 44 and the multiplexer 50. Finally, during horizontal blanking pulses 51–640, the controller 48 propagates data received from the PRINTER_OUT line to the video-data encoder/3-to-4 wire converter circuit 30 by enabling the buffer 46 and the multiplexer 50.

It has been discovered that all output signals respectively generated by the computing system 12 for the keyboard 18 and the mouse 20 may be readily contained within the time consumed by 25 blanking pulses. Furthermore, the 590 blanking pulses assigned for the transmission of output signals from the computing system 12 to the printer 22 is more than sufficient for containing all of the output signals generated by the computing system 12 for the printer 22 and that a number of these blanking pulses may be reassigned to support additional I/O devices. Finally, still more I/O devices may be supported by placement of output signals generated by the computing system 12 into the vertical blanking pulses contained in the VSYNC signal which occur each time a screen is scanned.

It is contemplated that the controller 48 performs the disclosed combining of the KEYBOARD_OUT, MOUSE_OUT and PRINTER_OUT signals into a combined output signal encoded such that all of the data occurs during the horizontal and vertical blanking pulses by executing an algorithm, set forth in microcode maintained and executed by the controller 48. It should be noted that some I/O devices may have multiple output lines instead of the single output line illustrated in FIG. 4 for each of the keyboard 18, mouse 20 and printer 22. For such devices, it is contemplated that the data encoder/decoder circuit 32 should be provided with additional circuitry and/or control signals which combines the multiple output lines into a single output signal. For example, the multiple output lines corresponding to a particular I/O device could be propagated to discrete locations within the buffer 42, 44 or 46 assigned to that I/O device. The microcode which enables the data held into the buffer to be propagated along the DATA_TX line could then be modified so that signals from the different output lines corresponding to a single I/O device could be transmitted during different ones of the blanking pulses assigned to that device.

Figure 6:
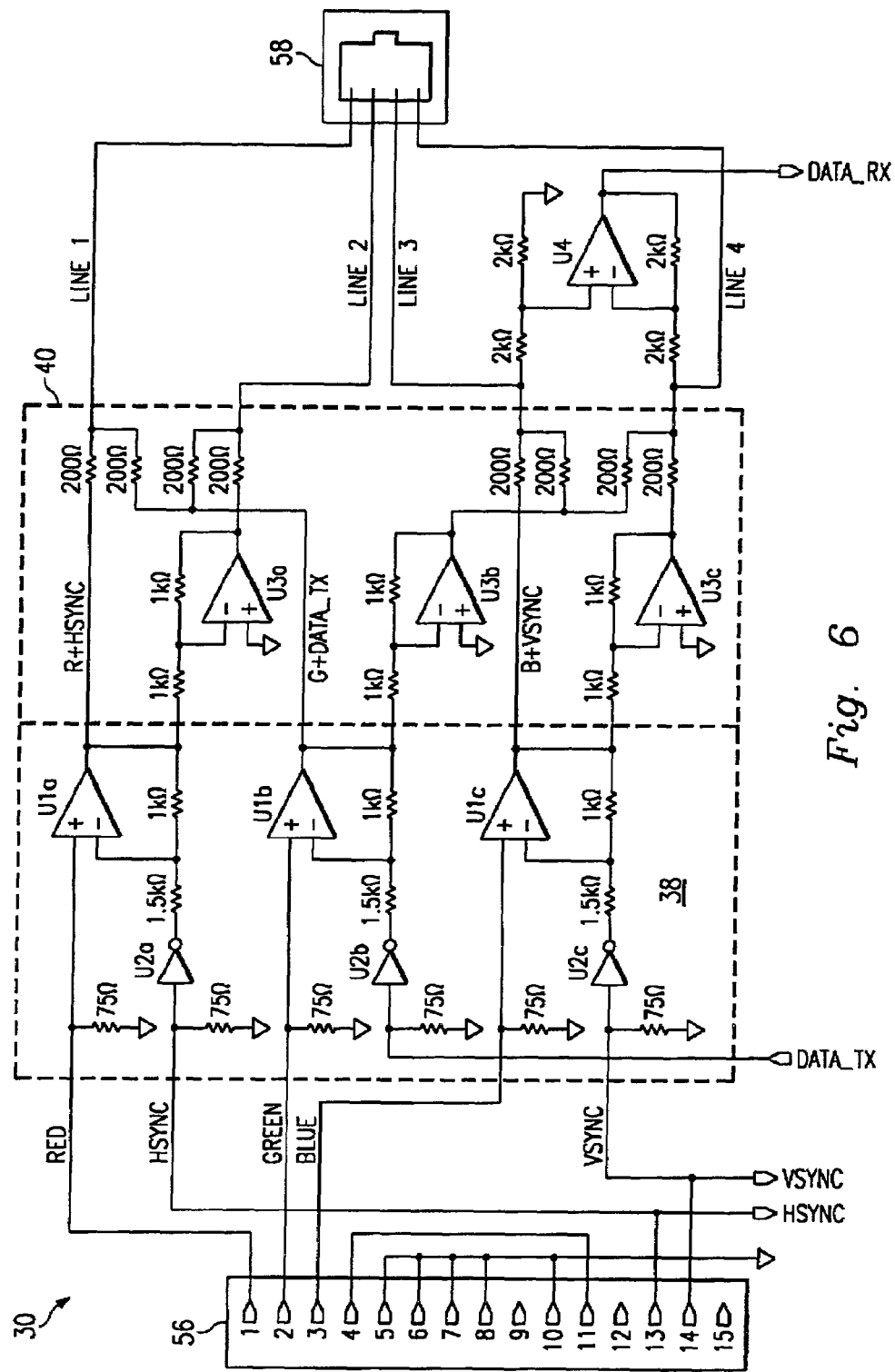
FIG. 6 is a circuit diagram illustrating a video-data encoder/3-to-4 wire converter circuit of the upstream extension interface of FIG. 3.

Referring next to FIG. 6, the video-data encoder/3-to-4 wire converter circuit 30 which receives the DATA_TX signal from the data encoder/decoder circuit 32 is comprised of an encoder circuit 38 coupled to a 3-4 wire converter circuit 40. Input to the encoder circuit 38 are the R, G, B, HSYNC, VSYNC and DATA_TX signals. The encoder circuit 38 is similar in construction to the encoder circuit described and illustrated in U.S. patent application Ser. No. 08/935,968 filed Sep. 23, 1997 entitled "Video Data Transmission and Display System and Associated Methods for Encoding/Decoding Synchronization Information and Video Data, assigned to the Assignee of the present invention and hereby incorporated by reference as if reproduced in its entirety. Specifically, operational amplifier U1a combines the R and HSYNC signals into a first combined signal R+HSYNC and operational amplifier U1c combines the B and VSYNC signals into a second combined signal B+VSYNC. In Ser. No. 08/935,968, the disclosed system was configured such that the G signal passed through the encoder unchanged. Here, however, the encoder circuit 38 is constructed to include operational amplifier U1b which combines the G and DATA_TX signals into a third combined signal G+DATA_TX. As data received from the computing system 12 and encoded by the data encoder/decoder circuit 32 into the DATA_TX signal is timed such that the data coincides with the blanking period for the G signal, the G and DATA_TX signals may be combined using a circuit identical to the circuits used to combine the R and HSYNC signals and to combine the B and VSYNC signals.

The R+HSYNC, B+VSYNC and G+DATA_TX signals output the encoder circuit 38 are transmitted to the 3-4 line converter circuit 40 where the three signals are placed on lines 1–4 of the 4-wire cable 28 for balanced-mode transmission to the human interface 14. The 3-to -4 wire converter 40 operates as described in co-pending U.S. patent application Ser. No. 08/674,626 filed Jul. 3, 1996 and previously incorporated by reference. Specifically, (R+HSYNC)+ and (G+DATA_TX)+ are placed on line 1, (R+HSYNC)– and (G+DATA_TX)+ are placed on line 2, (B+VSYNC)+ and (G+DATA_TX)– are placed on line 3 and (B+VSYNC)– and (G+DATA_TX)– are placed on line 4 of the 4-wire cable 28 for balanced mode transmission to the 4-to-3 wire converter/video-data decoder circuit 34.

Figure 7:
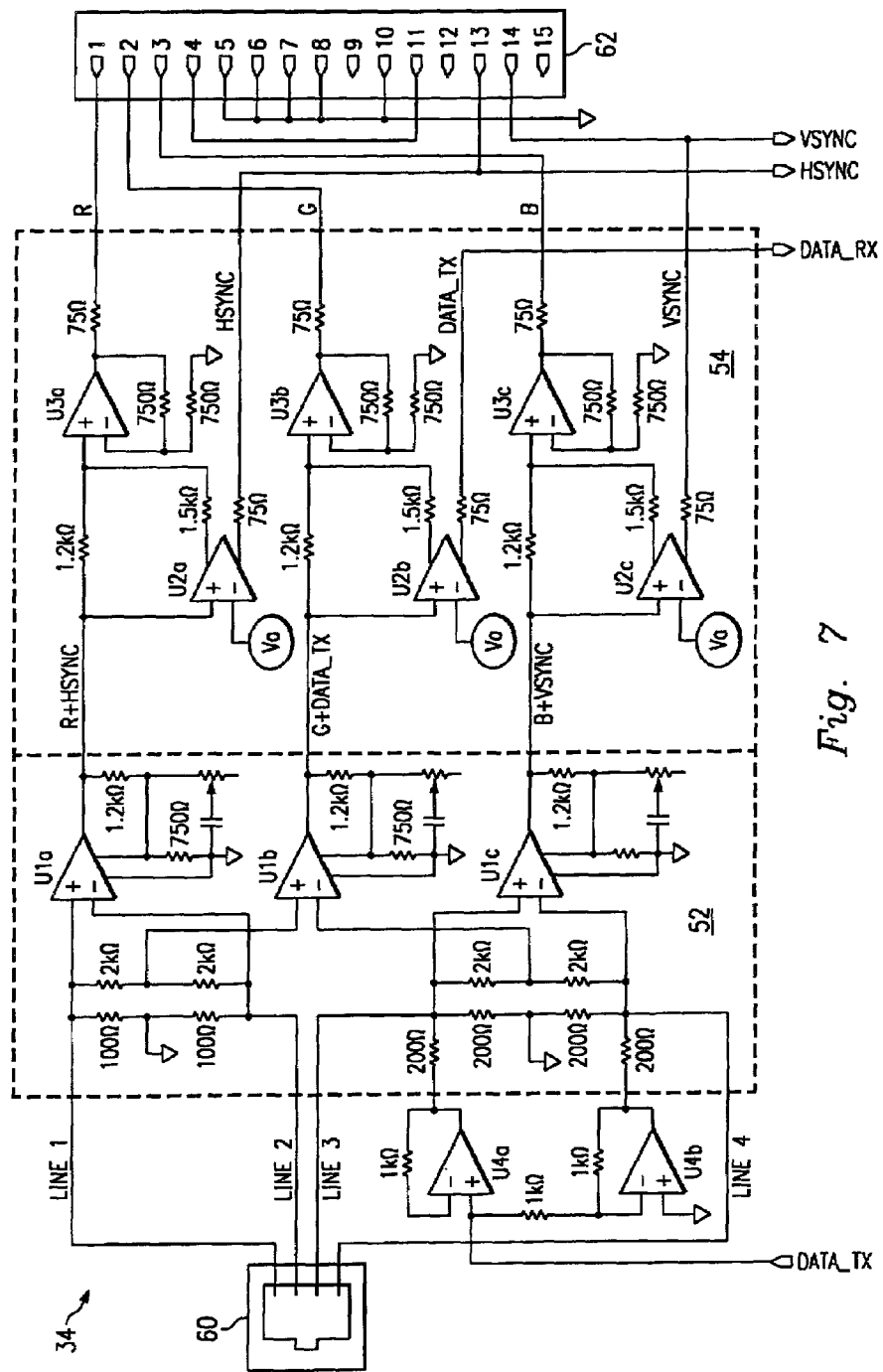
FIG. 7 is a circuit diagram illustrating a video-data decoder/4-to-3 wire converter of the downstream extension interface of FIG. 3.

Referring next to FIG. 7, the 4-to-3 wire converter/video-data decoder circuit 34 which receives the aforementioned video signals from the videodata encoder/3-to-4 wire converter circuit 30 along transmission lines 1–4 is comprised of a 4-to-3 converter 52 coupled to a decoder circuit 54. Input to the 4-to-3 converter 52 are the video signals transmitted along lines 1–4. In the manner more fully described in co-pending U.S. patent application Ser. No. 08/674,626 filed Jul. 3, 1996 and previously incorporated by reference, the output of operational amplifier U1a is the R+HSYNC signal, the output of operational amplifier U1b is the G+DATA_TX signal and the output of operational amplifier U1c is the B+VSYNC signal. The R+HSYNC, G+DATA and B+VSYNC signals are propagated from the 4-to-3 converter 52 to the decoder circuit 54. There, in the manner more fully described co-pending U.S. patent application Ser. No. 08/935,968 filed Sep. 23, 1997 and previously incorporated by reference, the output of operational amplifier U3a is the R signal, the output of the operational amplifier U2a is the HSYNC signal, the output of the operational amplifier U3c is the B signal and the output of operational amplifier U2c is the VSYNC signal. In Ser. No. 08/935,968, the disclosed system was configured such that the G signal passed through the decoder unchanged. Here, however, the decoder circuit 54 is constructed to include operational amplifiers U3b and U2b, the outputs of which are the G and DATA_TX signals, respectively.

It is an important aspect of the invention that the encoded video-data signal may be transmitted over the relatively inexpensive 4-wire transmission line used to connect telephones to a telecommunications network such as the public switched telephone network (or "PSTN"). As a result, therefore, the cost of cabling the DTE devices 6d through 6i such that the human interfaces 14 are located between 10 and 1,000 feet from the computing systems 12 is significantly reduced, particularly as the separation distance between the two is increased. Furthermore, the connection requirements for the video-data encoder/3-to-4 wire converter circuit 30 and the 4-to-3 wire converter/video-data decoder circuit 34 are significantly simplified. For example, while the input connector 56 which couples the encoder circuit 38 to cables extending from the computing system is a 15 pin video connector, the output connector 58 which couples the 3-to-4 wire converter 40 to the 4-wire cable 28 is a very inexpensive RJ-11 jack best known for its use as a telephone jack. Similarly, the input connector 60 which couples the 4-to-3 wire converter 52 to the 4-wire cable 28 is another very inexpensive RJ-11 jack while the output connecter 62 which couples the decoder circuit 54 to the monitor 16 is another 15 pin video connector.

Figure 5:
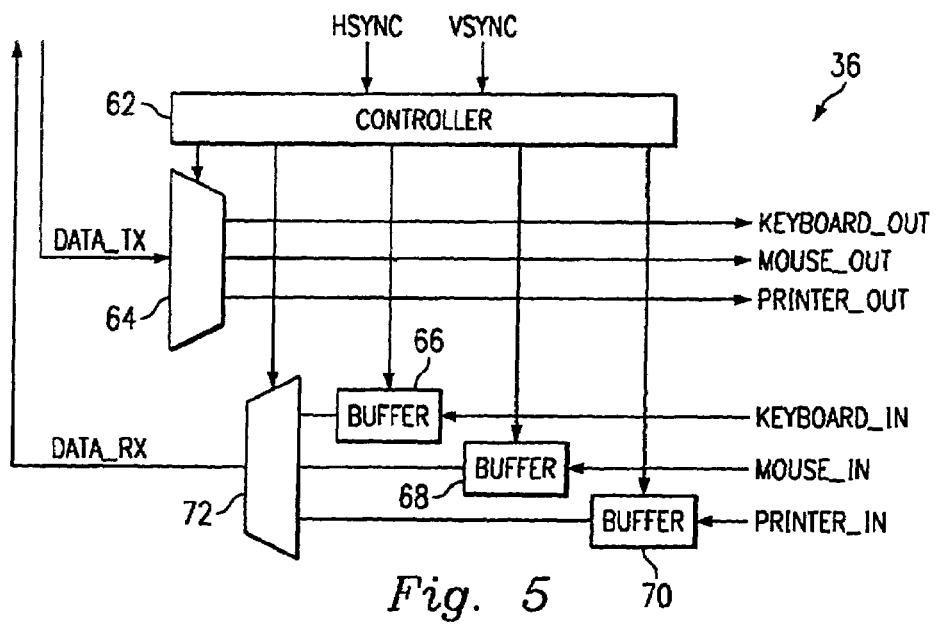
FIG. 5 is an expanded block diagram of a data decoder/encoder circuit of the downstream extension interface of FIG. 3.

Referring next to FIG. 5, the data decoder/encoder circuit 36 will now be described in greater detail. As may now be seen, the data decoder/encoder circuit 36 includes a controller 62 which receives the HSYNC and VSYNC signals from the 4-to-3 wire converter/video-data decoder circuit 34 and a 1:3 demultiplexer 64 having, as its data input, the DATA_TX line, a control input tied to an control output of the controller 62 and first, second and third data outputs— KEYBOARD_OUT, MOUSE_OUT and PRINTER_OUT—which are tied to the keyboard 18, the mouse 20 and the printer 22, respectively. The controller 62 separates keyboard, mouse and printer data from the combined DATA_TX signal by instructing the demultiplexer 64 as to when the input signal should be propagated as the KEYBOARD_OUT, MOUSE_OUT and PRINTER_OUT signals, respectively. To do so, the controller 62 receives the HSYNC and VSYNC signals from the 4-to-3 wire converter/video-data decoder circuit 34. The controller 62 counts the blanking pulses contained in the HSYNC and VSYNC signals, and, during each such blanking pulse of the HSYNC and VSYNC signals, instructs the demultiplexer 64 to propagate that portion of the DATA_TX signal received by the demultiplexer 64 during that blanking pulse to be output from the demultiplexer on a selected one of the KEYBOARD_OUT, MOUSE_OUT or PRINTER_OUT lines. For example, during horizontal blanking pulses 1–25, the controller 64 may propagate data received from the DATA_TX line on the KEYBOARD_OUT line. During horizontal blanking pulses 26–50, the controller 64 may propagate data received from the DATA_TX line on the MOUSE_OUT line. Finally, during horizontal blanking pulses 51–640, the controller 64 may propagate data received from the DATA TX line on the PRINTER OUT line. As before, it is contemplated that the controller 62 performs the disclosed separation of the KEYBOARD_OUT, MOUSE_OUT and PRINTER_OUT signals from the combined DATA_TX signal by executing an algorithm set forth in microcode maintained and executed by the controller 62.

Heretofore, only the transmission of signals from the computing system 12 to the keyboard 18, the mouse 20 and the printer 22 which collectively are the I/O devices forming part of the human interface 14 as been described. As it is typically preferred that computer systems are configured for bidirectional exchanges between the computing system 12 and I/O devices such as the keyboard, mouse and printer and the I/O devices, it is desired that the DTE 6d disclosed herein enable the transmission of signals from the keyboard 18, the mouse 20 and the printer 22 to the computing system 12.

Such a further enablement of the invention shall now be described in greater detail, again by referring to FIGS. 3, 4 and 5.

As may now be seen, signals output by the keyboard 18, the mouse 20 and the printer 22 are respectively transmitted along the KEYBOARD_IN, MOUSE_IN and PRINTER_IN lines to a respective buffer 66, 68 and 70. Each of the buffers 66, 68 and 70 have a control input tied to a respective control output of the controller 62 and an output tied to a corresponding input of 3:1 multiplexer 72. Similarly, the multiplexer 72 has a control input tied to a control output of the controller 62. As the operation of the data decoder/encoder circuit 36 in combining the KEYBOARD_IN, MOUSE_IN and PRINTER_IN signals into a combined data signal DATA_RX is identical to the operation of the data encoder/decoder circuit 32 in combining the KEYBOARD_OUT, MOUSE_OUT and PRINTER_OUT signals into the combined data signal DATA_TX, further description of the data decoder/encoder circuit 36 in generating the return path signal, hereafter referred to as the DATA_RX signal, is not deemed necessary. Similarly, as the data encoder/decoder circuit 32 includes a 1:3 demultiplexer 74 having an input which receives the DATA_RX signal, a control input tied to a control output of the controller 48 and first, second and third outputs on which KEYBOARD_IN, MOUSE_IN and PRINTER_IN signals are transmitted to the computing system and the data encoder/decoder circuit 32 separates the DATA RX signal into the KEYBOARD_IN, MOUSE_IN and PRINTER_IN signals in a manner identical to the operation of the data decoder/encoder circuit 36 in separating the KEYBOARD_OUT, MOUSE_OUT and PRINTER_OUT signals from the DATA_TX signal, further description of the data encoder/decoder circuit 32 in generating the KEYBOARD_IN, MOUSE_IN, and PRINTER_IN signals is also not deemed necessary.

Rather than directing the DATA_RX signal to the video-data decoder/4-to-3 wire converter, the DATA_RX signal is directed to a transmitter 76 which splits the DATA_RX line into two identical signals and directly injects the signal on each of lines 3 and 4 of the 4-wire cable 28 in differential mode. As the DATA_RX signal can only go high during the horizontal and/or vertical blanking pulses, data may be bi-directionally transferred between the computing system 12 and the I/O devices (the keyboard 18, the mouse 20 and the printer 22) without interfering with the video signal being transferred from the computing system 12 to the video monitor 16. Furthermore, the microcode contained in the controllers 48 and 62 may be readily modified to enable bidirectional transmissions. For example, other blanking pulses may be assigned to the KEYBOARD_IN, MOUSE_IN and PRINTER_IN signals. Alternately, the blanking pulses may be subdivided into "in" and "out" portions. For example, some of the horizontal blanking pulses 1–25 may be assigned to KEYBOARD_OUT while others of the horizontal blanking pulses 1–25 may be assigned to KEYBOARD_IN. By enabling the controllers 48 and 62 to distinguish between signals going from the I/O devices to the computing system 12 and signals going from the computing system 12 to the I/O devices, the controllers 48 and 62 can respectively instruct the multiplexers 74 and 64 to ignore signals received from the DATA_RX and DATA_TX lines if such data was received at times indicating that the data is intended to travel in the opposite direction.

As previously stated, the transmitter 76 places DATA_RX on both lines 3 and 4 of the 4-wire cable 28. Lines 3 and 4 are further coupled to inputs of receiver 78 which provides, as its output, the signal DATA_RX. By placing DATA_RX on both lines, noise on the lines may be detected as any differential between the signals respectively received on the lines 3 and 4, thereby providing noise immunization, as well as reduced EMI radiation levels, for transmissions along the lines 3 and 4.

Finally, referring again to FIG. 7, the outputs of the operational amplifiers U1a, U1b and U1c have ganged controls which adjust the frequency response of the system. These controls compensate for the DC and high frequency losses in the 4-wire cable 28 used to connect the upstream extension interface 24 with the downstream extension interface 26. In addition, these controls may be used enhance the image to the user's taste by providing a "tone" control for video in which the high frequency video energy may be boosted to restore edges and definition to the display. As this equalization can make edges easier for tired eyes to detect, and thus recognize, it is a user-adjustable control.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A computer network, comprising:
   a plurality of interconnected nodes, each one of said plurality of nodes having a corresponding data terminal equipment (DTE) device coupled thereto, wherein each of said corresponding DTE devices comprises:
      a computing system located at a first location;
      a human interface located remotely from said first location, said human interface comprising a display device and an input/output ("I/O") device;
      a first interface device operable to couple to said computing system;
      a second interface device operable to couple to said display device and said I/O device of said human interface, wherein the second interface device is not operable to execute application software; and
      at least one transmission line operable to couple said first and second interface devices;
      wherein said first interface device is operable to receive from said computing system a video signal to be transmitted to said display device and a non-video signal to be transmitted to said I/O device, and to convert each of said video signal and said non-video signal into a format suitable for transmission to said second interface device;
      wherein said first interface device is operable to transmit said converted video signal and said converted non-video signal to said second interface device via said at least one transmission line;
      wherein said second interface device is operable to receive said converted video signal and said converted non-video signal from said first interface device and to provide said video signal and said non-video signal to said display device and said I/O device, respectively; and
   wherein the computing systems of the DTE devices are commonly located at the first location.

2. The computer network according to claim 1,
   wherein the computing system is operable to generate the video signal and the non-video signal in a first format suitable for transmission to the human interface; and
   wherein the first interface device is operable to receive the video signal and non-video signal in the first format and convert each of the video signal and the non-video signal into a second format suitable for transmission to said second interface device.

3. The computer network according to claim 2, wherein the second format is suitable for transmission over distances greater than 10 feet.

4. The computer network according to claim 2, wherein the second interface device is operable to receive the video signal and non-video signal in the second format and convert the video signal and non-video signal back to the first format suitable for transmission to the human interface.

5. The computer network according to claim 1, wherein the first interface device is operable to convert the video signal into a first format suitable for transmission to said second interface device; and
wherein the first interface device is operable to convert the non-video signal into a second different format suitable for transmission to said second interface device.

6. The computer network according to claim 1, wherein said first interface device is operable to encode each of said video signal and said non-video signal into a format suitable for transmission to said second interface device; and
wherein said second interface device is operable to decode said encoded video signal and said encoded non-video signal to reproduce said video signal and said non-video signal, wherein said video signal and said non-video signal are provided to said display device and said I/O device, respectively.

7. The computer network according to claim 1, wherein said first interface device is operable to encode said video signal into an encoded video signal having a format suitable for transmission to said second interface device;
wherein said first interface device is operable to encode said non-video signal into an encoded non-video signal having a format suitable for transmission to said second interface device;
wherein said second interface device is operable to decode said encoded video signal to reproduce said video signal; and
wherein said second interface device is operable to decode said encoded non-video signal to reproduce said non-video signal.

8. The computer network according to claim 1, wherein said at least one transmission line comprises a first transmission line and a second transmission line;
wherein said converted video signal is transmitted to said second interface device via said first transmission line; and
wherein said converted non-video signal is transmitted to said second interface device via said second transmission line.

9. The computer network according to claim 1, wherein said first interface device is operable to combine said video signal and said non-video signal into a combined video/non-video signal having a format suitable for transmission to said second interface device;
wherein said combined video/non-video signal is transmitted to said second interface device via said at least one transmission line; and
wherein said second interface device is operable to receive said combined video/non-video signal from said first interface device and separate said video signal and said non-video signal therefrom for respective propagation to said display device and said I/O device.

10. The computer network according to claim 1, wherein said first interface device includes an encoding circuit for encoding the video signal and the non-video signal into an encoded format suitable for transmission to said second interface device; and
wherein said second interface device includes a decoding circuit for receiving the video signal and the non-video signal in the encoded format and decoding the video signal and the non-video signal.

11. The computer network according to claim 10, wherein said encoding circuit is operable to combine said video signal and said non-video signal into a combined video/non-video signal having a format suitable for transmission to said second interface device; and
wherein said decoding circuit is operable to receive said combined video/non-video signal from said first interface device and separate said video signal and said non-video signal therefrom for respective propagation to said display device and said I/O device.

12. The computer network according to claim 1, wherein said at least one transmission line coupling said first and second interface devices is a 4-wire cable.

13. The computer network according to claim 1, further comprising at least one cable for interconnecting said plurality of nodes.

14. The computer network according to claim 1, wherein said computing system further comprises a computer chassis and at least one computing system component housed in said computer chassis and coupled to said first interface device.

15. The computer network according to claim 1, wherein said I/O device of said human interface further comprises either a printer, a keyboard, or a mouse.

16. The computer network according to claim 1, wherein the human interface is located more than 10 feet from the computing system.

17. The computer network according to claim 1, wherein said second interface is operable to receive from said I/O device a second non-video signal to be transmitted to said computing system, and is operable to convert said second non-video signal into a format suitable for transmission to said first interface device;
wherein said converted second non-video signal is transmitted to said first interface device via said at least one transmission line; and
wherein said first interface device is operable to receive said converted second non-video signal from said second interface device and provide said second non-video signal to the computing system.

18. The computer network according to claim 17, wherein the I/O device is operable to generate the second non-video signal in a first format suitable for transmission to the computing system; and
wherein the second interface device is operable to convert the second non-video signal into a second format suitable for transmission to said first interface device.

19. The computer network according to claim 18, wherein the second format is suitable for transmission over distances greater than 10 feet.

20. The computer network according to claim 18, wherein the first interface device is operable to receive the second non-video signal in the second format and convert the second non-video signal back to the first format suitable for transmission to the computing system.

21. The computer network according to claim 1, wherein said computing systems are housed together in a shared computer room.

22. The computer network according to claim 1, wherein said computing systems are housed together in a common support structure located in a shared computer room.

23. The computer network according to claim 22, wherein said common support structure is a computer rack.

24. The computer network according to claim 1, wherein at least two of the human interfaces are remotely located from each other.

25. The computer network of claim 1, wherein the display device is a computer monitor.

26. A computer network, comprising:
a plurality of interconnected nodes, each one of said nodes having a DTE device coupled thereto and wherein each DTE device comprises:
a computing system located at a first location;
a human interface located at a respective second location, said second location remotely located relative to said first location;
a first interface device coupled to said computing system;
a second interface device coupled to said human interface, wherein the second interface device is not operable to execute application software; and
at least one transmission line coupling said first and second interface devices;
wherein said first interface device is operable to receive human interface signals generated by said computing system and convert the human interface signals into a format suitable for transmission to said second interface device;
wherein said second interface device is operable to receive said human interface signals from the first interface device and convert the human interface signals into a format suitable for transmission to the human interface; and
wherein the computing systems of the DTE devices are commonly located at the first location.

27. The computer network according to claim 26,
wherein the computing system is operable to generate the human interface signals in a first format; and
wherein said second interface device is operable to receive said human interface signals from the first interface device and convert the human interface signals back into the first format for transmission to the human interface.

28. The computer network according to claim 26,
wherein the computing system is operable to generate the human interface signals in a first format suitable for transmission to the human interface; and
wherein the first interface device is operable to convert the human interface signals into a second format suitable for transmission to said second interface device.

29. The computer network according to claim 28,
wherein the second format is suitable for transmission over distances greater than 10 feet.

30. The computer network according to claim 28,
wherein the second interface device is operable to receive the human interface signals in the second format and convert the human interface signals in the second format back to the first format suitable for transmission to the human interface.

31. The computer network according to claim 26,
wherein said first interface device is operable to encode said human interface signals into a format suitable for transmission to said second interface device; and
wherein said second interface device is operable to decode said encoded human interface signals to reproduce said human interface signals, wherein said human interface signals are provided to said human interface.

32. The computer network according to claim 26,
wherein the human interface comprises a plurality of human interface devices; and
wherein the human interface signals comprise a plurality of human interface signals corresponding to the plurality of human interface devices.

33. The computer network according to claim 32,
wherein said first interface device is operable to receive the plurality of human interface signals generated by said computing system and convert the plurality of human interface signals into a format suitable for transmission to said second interface device; and
wherein said second interface device is operable to receive said plurality of human interface signals from the first interface device and convert the plurality of human interface signals into a format suitable for transmission to the human interface.

34. The computer network according to claim 33,
wherein the computing system is operable to generate the plurality of human interface signals in a first format suitable for transmission to the human interface; and
wherein the first interface device is operable to convert each of the plurality of human interface signals into a second format suitable for transmission to said second interface device.

35. The computer network according to claim 34,
wherein the second format is suitable for transmission over distances greater than 10 feet.

36. The computer network according to claim 34,
wherein the second interface device is operable to receive the plurality of human interface signals in the second format and convert each of the plurality of human interface signals in the second format back to the first format suitable for transmission to the human interface.

37. The computer network according to claim 32,
wherein the plurality of human interface signals includes a first human interface signal and a second human interface signal;
wherein the first interface device is operable to convert the first human interface signal into a first format suitable for transmission to said second interface device; and
wherein the first interface device is operable to convert the second human interface signal into a second different format suitable for transmission to said second interface device.

38. The computer network according to claim 32,
wherein the plurality of human interface signals includes a first human interface signal and a second human interface signal;
wherein said at least one transmission line comprises a first transmission line and a second transmission line;
wherein said first human interface signal is transmitted to said second interface device via said first transmission line; and
wherein said second human interface signal is transmitted to said second interface device via said second transmission line.

39. The computer network according to claim 32,
  wherein said first interface device is operable to combine said plurality of human interface signals into a combined signal having a format suitable for transmission to said second interface device;
  wherein said combined signal is transmitted to said second interface device via said at least one transmission line; and
  wherein said second interface device is operable to receive said combined signal from said first interface device and separate said plurality of human interface signals for respective propagation to said plurality of human interface devices.

40. The computer network according to claim 26,
  wherein the computing system generates a plurality of human interface signals corresponding to a plurality of human interface devices;
  wherein said first interface device is operable to receive each of said plurality of human interface signals generated by said computing system and convert each of said plurality of human interface signals into a format suitable for transmission to said second interface device; and
  wherein said second interface device is operable to receive each of said plurality of converted human interface signals from the first interface device and convert each of the plurality of converted human interface signals into a format suitable for transmission to the human interface.

41. The computer network according to claim 40,
  wherein said first interface device is operable to combine said plurality of human interface signals into a combined signal having a format suitable for transmission to said second interface device;
  wherein said combined signal is transmitted to said second interface device via said at least one transmission line; and
  wherein said second interface device is operable to receive said combined signal from said first interface device and separate said plurality of human interface signals for respective propagation to said plurality of human interface devices.

42. The computer network according to claim 41,
  wherein said human interface comprises a display device and at least one input/output ("I/O") device;
  wherein the second interface device is coupled to the display device and the at least one I/O device of said human interface; and
  wherein the plurality of human interface signals include a video signal intended for the display device and at least one I/O signal intended for the I/O device.

43. The computer network according to claim 26,
  wherein said human interface comprises a display device and an input/output ("I/O") device;
  wherein the second interface device is coupled to the display device and the I/O device of said human interface; and
  wherein the human interface signals include a video signal intended for the display device and an I/O signal intended for the I/O device.

44. The computer network according to claim 43, wherein said I/O device of said human interface comprises either a keyboard or a mouse.

45. The computer network according to claim 43,
  wherein said first interface device is operable to combine said video signal and said I/O signal into a combined video/I/O signal having a format suitable for transmission to said second interface device;
  wherein said combined video/I/O signal is transmitted to said second interface device via said at least one transmission line; and
  wherein said second interface device is operable to receive said combined video/I/O signal from said first interface device and separate said video signal and said I/O signal therefrom for respective propagation to said display device and said I/O device.

46. The computer network according to claim 26,
  wherein said human interface comprises a display device and a plurality of input/output ("I/O") devices;
  wherein the second interface device is coupled to the display device and the plurality of I/O devices of said human interface; and
  wherein the human interface signals include a video signal intended for the display device and a plurality of I/O signals intended for the plurality of I/O devices.

47. The computer network according to claim 26, wherein said at least one transmission line coupling said first and second interface devices is a 4-wire cable.

48. The computer network according to claim 26, wherein the human interface is located more than 10 feet from the computing system.

49. The computer network according to claim 26,
  wherein the human interface includes a human interface device;
  wherein said second interface is operable to receive, from the human interface device, second human interface signals to be transmitted to said computing system, and is operable to convert said second human interface signals into a format suitable for transmission to said first interface device;
  wherein said converted second human interface signals are transmitted to said first interface device via said at least one transmission line; and
  wherein said first interface device is operable to receive said converted second human interface signals from said second interface device and provide said second human interface signals to the computing system.

50. The computer network according to claim 49,
  wherein the human interface device is operable to generate the second human interface signals in a first format suitable for transmission to the computing system; and
  wherein the second interface device is operable to convert the second human interface signals into a second format suitable for transmission to said first interface device.

51. The computer network according to claim 50,
  wherein the second format is suitable for transmission over distances greater than 10 feet.

52. The computer network according to claim 50,
  wherein the first interface device is operable to receive the second human interface signals in the second format and convert the second human interface signals back to the first format suitable for transmission to the computing system.

53. The computer network according to claim 26, wherein said computing systems are housed together in a common support structure located in a shared computer room.

54. A computer network, comprising:
  a plurality of interconnected nodes, each one of said nodes having a DTE device coupled thereto and wherein each DTE device comprises:

a computing system located at a first location;

a human interface located at a respective second location, said second location remotely located relative to said first location, said human interface comprising a display device and an input/output ("I/O") device;

a first interface device coupled to said computing system;

a second interface device coupled to said display device and said I/O device of said human interface, wherein the second interface device is not operable to execute application software; and a transmission line coupling said first and second interface devices;

wherein said first interface device is operable to convert signals generated by said computing system into a format suitable for transmission to said second interface device, and wherein said second interface device is operable to convert signals received from said first interface device into a format suitable for transmission to said human interface; and wherein the computing systems of the DTE devices are commonly located at the first location.

55. A computer network, comprising:

a plurality of interconnected nodes, each one of said nodes having a DTE device coupled thereto and wherein each DTE device comprises:

a computing system located at a first location;

a human interface located at a respective second location, said second location remotely located relative to said first location, said human interface comprising a display device and an input/output ("I/O") device;

a first interface device coupled to said computing system;

a second interface device coupled to said display device and said I/O device of said human interface, wherein the second interface device is not operable to execute application software; and at least one transmission line coupling said first and second interface devices;

wherein said first interface device is operable to receive, from said computing system, a video signal to be transmitted to said display device, and to convert said video signal into a format suitable for transmission to said second interface device;

wherein said converted video signal is transmitted to said second interface device via said at least one transmission line; and wherein said second interface device is operable to receive said converted video signal from said first interface device and provide said video signal to said display device; and wherein the computing systems of the DTE devices are commonly located at the first location.

56. The computer network according to claim 55, wherein the computing system is operable to generate the video signal in a first format suitable for transmission to the human interface; and wherein the first interface device is operable to convert the video signal into a second format suitable for transmission to said second interface device.

57. The computer network according to claim 56, wherein the second format is suitable for transmission over distances greater than 10 feet.

58. The computer network according to claim 56, wherein the second interface device is operable to receive the video signal in the second format and convert the video signal back to the first format suitable for transmission to the human interface.

59. The computer network according to claim 55, wherein said second interface device is operable to receive, from said I/O device, a non-video signal to be transmitted to said computing system, and to convert said non-video signal into a format suitable for transmission to said first interface device;

wherein said converted non-video signal is transmitted to said first interface device via said at least one transmission line; and wherein said first interface device is operable to receive said converted non-video signal from said second interface device and provide said non-video signal to the computing system.

60. The computer network according to claim 59, wherein the I/O device is operable to generate the non-video signal in a first format suitable for transmission to the computing system; and wherein the second interface device is operable to convert the non-video signal into a second format suitable for transmission to said first interface device.

61. The computer network according to claim 60, wherein the second format is suitable for transmission over distances greater than 10 feet.

62. The computer network according to claim 60, wherein the first interface device is operable to receive the non-video signal in the second format and convert the non-video signal back to the first format suitable for transmission to the computing system.

63. The computer network according to claim 59, wherein said first interface device is operable to receive, from said computing system, a non-video signal to be transmitted to said I/O device, and to convert said non-video signal into a format suitable for transmission to said second interface device;

wherein said converted non-video signal is transmitted to said second interface device via said at least one transmission line; and wherein said second interface device is operable to receive said converted non-video signal from said first interface device and provide said non-video signal to said I/O device.

64. The computer network according to claim 55, wherein said first interface device is operable to receive, from said computing system, a non-video signal to be transmitted to said I/O device, and to convert said non-video signal into a format suitable for transmission to said second interface device;

wherein said converted non-video signal is transmitted to said second interface device via said at least one transmission line; and wherein said second interface device is operable to receive said converted non-video signal from said first interface device and provide said non-video signal to said I/O device.

65. A computer network, comprising:

a plurality of interconnected nodes, each one of said nodes having a DTE device coupled thereto and wherein each DTE device comprises:

a computing system located at a first location;

a human interface located at a respective second location, said second location remotely located relative to said first location;

a first interface device coupled to said computing system;
a second interface device coupled to said human interface, wherein the second interface device is not operable to execute application software; and
a transmission line coupling said first and second interface devices;
wherein said second interface device is operable to receive human interface signals generated by said human interface and convert the human interface signals into a format suitable for transmission to said first interface device; and
wherein said first interface device is operable to receive said converted human interface signals from the second interface device and convert the converted human interface signals into a format suitable for transmission to the computing system; and
wherein the computing systems of the DTE devices are commonly located at the first location.

66. The computer network according to claim 65, wherein said first interface device is operable to receive said converted human interface signals from the second interface device and convert the converted human interface signals into the human interface signals for transmission to the computing system.

67. The computer network according to claim 65, wherein the human interface is operable to generate the human interface signals in a first format suitable for transmission to the computing system; and
wherein the second interface device is operable to convert the human interface signals into a second format suitable for transmission to said first interface device.

68. The computer network according to claim 67, wherein the second format is suitable for transmission over distances greater than 10 feet.

69. The computer network according to claim 67, wherein the first interface device is operable to receive the human interface signals in the second format and convert the human interface signals back to the first format suitable for transmission to the computing system.

70. The computer network according to claim 65, wherein said first interface device is operable to receive human interface signals generated by said computing system and convert the human interface signals into a format suitable for transmission to said second interface device; and
wherein said second interface device is operable to receive said converted human interface signals from the first interface device and convert the converted human interface signals into a format suitable for transmission to the human interface.

71. A computer network, comprising:
a plurality of interconnected nodes, each one of the plurality of nodes having a corresponding data terminal equipment (DTE) device coupled thereto, wherein each of the corresponding DTE devices comprises:
a computing system located at a first location;
a human interface located remotely from the first location, the human interface comprising a display device and an input/output ("I/O") device;
a first interface device operable to couple to the computing system;
a second interface device operable to couple to the display device and the I/O device of the human interface, wherein the second interface device is not operable to execute application software; and
a transmission medium operable to couple the first and second interface devices;
wherein the first interface device is operable to receive information from the computing system comprising video information intended for display on the display device and non-video information intended for the I/O device, and to convert the information into a format suitable for transmission to the second interface device;
wherein the first interface device is operable to transmit the converted information to the second interface device via the transmission medium;
wherein the second interface device is operable to receive the converted information from the first interface device and to provide the video information and the non-video information for transmission to the display device and the I/O device, respectively; and
wherein the computing systems of the DTE devices are commonly located at the first location.

72. The computer network according to claim 71, wherein the video information comprises a video signal.

73. The computer network according to claim 72, wherein the video signal comprises an analog signal.

74. The computer network according to claim 73, wherein the analog signal comprises a Red signal, a Blue signal, and a Green signal.

75. The computer network according to claim 73, wherein the analog signal further comprises a Horizontal Sync signal and a Vertical Sync signal.

76. The computer network according to claim 71, wherein the non-video information comprises a non-video signal.

77. A computer network according to claim 71,
wherein the computing system is operable to generate the information in a first format suitable for transmission to the human interface; and
wherein the first interface device is operable to convert the information into a second format suitable for transmission to the second interface device.

78. A computer network according to claim 77,
wherein the second format is suitable for transmission over distances greater than 10 feet.

79. A computer network according to claim 77,
wherein the second interface device is operable to receive the information in the second format and convert the information back to the first format suitable for transmission to the human interface.

80. A computer network according to claim 71,
wherein the format is suitable for transmission over distances greater than 10 feet.

81. A computer network according to claim 71, wherein, in receiving information from the computing system comprising video information intended for display on the display device and non-video information intended for the I/O device, the first interface device is operable to receive a first signal comprising the video information and a second signal comprising the non-video information.

82. A computer network according to claim 81, wherein, in converting the information into a format suitable for transmission to the second interface device, the first interface device is operable to combine the first signal and the second signal to generate a combined signal for transmission to the second interface device.

83. A computer network according to claim 71,
wherein the first interface device is operable to encode each of the video information and the non-video information into the format suitable for transmission to the second interface device; and wherein the second interface device is operable to decode the encoded video information and the encoded non-video information to reproduce the video information intended for display on the display device and the non-video information intended for the IJ/O device, wherein the video information and the non-video information are provided to the display device and the I/O device, respectively.

84. A computer network according to claim 71,
wherein the first interface device is operable to encode the video information into an encoded signal having a format suitable for transmission to the second interface device;
wherein the first interface device is operable to encode the non-video information into an encoded non-video signal having a format suitable for transmission to the second interface device;
wherein the second interface device is operable to decode the encoded video signal to reproduce the video information; and
wherein the second interface device is operable to decode the encoded non-video signal to reproduce the non-video information.

85. A computer network according to claim 71,
wherein the first interface device is operable to combine the video information and the non-video information into a combined video/non-video signal having the format suitable for transmission to the second interface device;
wherein the combined video/non-video signal is transmitted to the second interface device via the transmission medium; and
wherein the second interface device is operable to receive the combined video/non-video signal from the first interface device and separate the video information and the non-video information therefrom for respective propagation to the display device and the I/O device.

86. A computer network according to claim 71,
wherein the first interface device includes an encoding circuit for encoding the video information and the non-video information into an encoded format suitable for transmission to the second interface device;
wherein the second interface device includes a decoding circuit for receiving the video information and the non-video information in the encoded format and decoding the video information and the non-video information.

87. A computer network according to claim 71, wherein the transmission medium coupling the first and second interface devices is a cable comprising 4 wires.

88. A computer network according to claim 71, and further comprising a cable for interconnecting the plurality of nodes.

89. A computer network according to claim 71, wherein the I/O device of the human interface further comprises either a printer, a keyboard, or a mouse.

90. A computer network according to claim 71, wherein the human interface is located more than 10 feet from the computing system.

91. A computer network according to claim 71,
wherein the second interface is operable to receive from the I/O device second information comprising second non-video information to be transmitted to the computing system and to convert the second non-video information into a format suitable for transmission to the first interface device;
wherein the converted second non-video information is transmitted to the first interface device via the transmission medium; and
wherein the first interface device is operable to receive the converted second non-video information from the second interface device and provide the second non-video information to the computing system.

92. A computer network according to claim 91,
wherein the I/O device is operable to generate the second information in a first format suitable for transmission to the computing system; and
wherein the second interface device is operable to convert the second non-video information into a second format suitable for transmission to the first interface device.

93. A computer network according to claim 92,
wherein the second format is suitable for transmission over distances greater than 10 feet.

94. A computer network according to claim 92,
wherein the first interface device is operable to receive the second non-video information in the second format and convert the second non-video information back to the first format suitable for transmission to the computing system.

95. A computer network according to claim 71, wherein the computing systems are housed together in a common support structure located in a shared computer room.

96. A computer network, comprising:
a plurality of interconnected nodes, each one of the nodes having a DTE device coupled thereto and wherein the DTE device coupled to a first one of the nodes further comprises:
a computing system located at a first location;
a human interface located at a respective second location, the second location remotely located relative to the first location;
a first interface device coupled to the computing system; and
a second interface device coupled to the human interface, wherein the second interface device is not operable to execute application software;
a transmission medium coupling the first and second interface devices;
wherein the first interface device is operable to receive human interface signals comprising video information and non-video information generated by the computing system and convert the human interface signals into a format suitable for transmission to the second interface device;
wherein the second interface device is operable to receive the human interface signals from the first interface device and convert the human interface signals into a format suitable for transmission to the human interface; and
wherein the computing systems of the DTE devices are commonly located at the first location.

97. The computer network according to claim 96, wherein the human interface signals comprise a video signal comprising the video information and a non-video signal comprising the non-video information.

98. The computer network according to claim 97, wherein the video signal comprises an analog signal.

99. The computer network according to claim 98, wherein the analog signal comprises a Red signal, a Blue signal, and a Green signal.

100. The computer network according to claim 99, wherein the analog signal further comprises a Horizontal Sync signal and a Vertical Sync signal.

101. A computer network according to claim 97,
wherein the computing system is operable to generate the human interface signals in a first format; and
wherein the second interface device is operable to receive the human interface signals from the first interface device and convert the human interface signals back into the first format for transmission to the human interface.

102. A computer network according to claim 96,
wherein the computing system is operable to generate the human interface signals in a first format suitable for transmission to the human interface; and
wherein the first interface device is operable to convert the human interface signals into a second format suitable for transmission to the second interface device.

103. A computer network according to claim 102,
wherein the second format is suitable for transmission over distances greater than 10 feet.

104. A computer network according to claim 102,
wherein the second interface device is operable to receive the human interface signals in the second format and convert the human interface signals in the second format back to the first format suitable for transmission to the human interface.

105. A computer network according to claim 96,
wherein the first interface device is operable to encode the human interface signals into a format suitable for transmission to the second interface device; and
wherein the second interface device is operable to decode the encoded human interface signals to reproduce the human interface signals, including the video information and the non-video information, and wherein the human interface signals are provided to the human interface.

106. A computer network according to claim 96,
wherein the human interface comprises a plurality of human interface devices; and
wherein the human interface signals comprise a plurality of human interface signals corresponding to the plurality of human interface devices.

107. A computer network according to claim 106,
wherein the first interface device is operable to receive the plurality of human interface signals generated by the computing system and convert the plurality of human interface signals into the format suitable for transmission to the second interface device; and
wherein the second interface device is operable to receive the plurality of human interface signals from the first interface device and convert the plurality of human interface signals into the format suitable for transmission to the human interface.

108. A computer network according to claim 107,
wherein the computing system is operable to generate the plurality of human interface signals in a first format suitable for transmission to the human interface;
wherein the first interface device is operable to convert each of the plurality of human interface signals into a second format suitable for transmission to the second interface device.

109. A computer network according to claim 108,
wherein the second format is suitable for transmission over distances greater than 10 feet.

110. A computer network according to claim 108,
wherein the second interface device is operable to receive the plurality of human interface signals in the second format and convert each of the plurality of human interface signals in the second format back to the first format suitable for transmission to the human interface.

111. A computer network according to claim 106,
wherein the plurality of human interface signals includes a first human interface signal comprising the video information and a second human interface signal comprising the non-video information;
wherein the first interface device is operable to convert the first human interface signal into a first format suitable for transmission to the second interface device; and
wherein the first interface device is operable to convert the second human interface signal into a second different format suitable for transmission to the second interface device.

112. A computer network according to claim 106,
wherein the plurality of human interface signals includes a first human interface signal comprising the video information and a second human interface signal comprising the non-video information;
wherein the transmission medium comprises a first transmission medium and a second transmission medium;
wherein the first human interface signal is transmitted to the second interface device via the first transmission medium; and
wherein the second human interface signal is transmitted to the second interface device via the second transmission medium.

113. A computer network according to claim 106,
wherein the first interface device is operable to combine the plurality of human interface signals into a combined signal including the video information and the non-video information having a format suitable for transmission to the second interface device;
wherein the combined signal is transmitted to the second interface device via the transmission medium;
wherein the second interface device is operable to receive the combined signal from the first interface device and separate the plurality of human interface signals for respective propagation to the plurality of human interface devices.

114. A computer network according to claim 96,
wherein the computing system generates a plurality of human interface signals corresponding to a plurality of human interface devices, and wherein the plurality of human interface signals includes the video information and the non-video information;
wherein the first interface device is operable to receive each of the plurality of human interface signals generated by the computing system and convert each of the plurality of human interface signals into a format suitable for transmission to the second interface device;
wherein the second interface device is operable to receive each of the plurality of converted human interface signals from the first interface device and convert each of the plurality of converted human interface signals into a format suitable for transmission to the human interface.

115. A computer network according to claim 114,
wherein the first interface device is operable to combine the plurality of human interface signals into a combined signal, including the video information and the non-video information, having a format suitable for transmission to the second interface device;
wherein the combined signal is transmitted to the second interface device via the transmission medium; and wherein the second interface device is operable to receive the combined signal from the first interface device and separate the plurality of human interface signals for respective propagation to the plurality of human interface devices.

116. A computer network according to claim 115,
wherein the human interface comprises a display device and at least one input/output ("I/O") device;
wherein the second interface device is coupled to the display device and the at least one I/O device of the human interface; and
wherein the plurality of human interface signals include a video signal intended for the display device and at least one I/O signal intended for the I/O device.

117. A computer network according to claim 96,
wherein the human interface comprises a display device and an input/output ("I/O") device;
wherein the second interface device is coupled to the display device and the I/O device of the human interface; and
wherein the video information is intended for the display device and the non-video information comprises I/O information intended for the I/O device.

118. A computer network according to claim 117, wherein the I/O device of the human interface comprises either a keyboard or a mouse.

119. A computer network according to claim 117,
wherein the first interface device is operable to include the video information and the I/O information in a combined video/I/O signal having a format suitable for transmission to the second interface device;
wherein the combined video/I/O signal is transmitted to the second interface device via the at least one transmission line;
wherein the second interface device is operable to receive the combined video/I/O signal from the first interface device and separate the video information and the I/O information therefrom for respective provision to the display device and the I/O device.

120. A computer network according to claim 96,
wherein the human interface comprises a display device and a plurality of input/output ("I/O") devices;
wherein the second interface device is coupled to the display device and the plurality of I/O devices of the human interface; and
wherein the human interface signals include a video signal comprising the video information intended for the display device and a plurality of I/O signals comprising the non-video information intended for the plurality of I/O devices.

121. A computer network according to claim 96, wherein the at least one transmission line coupling the first and second interface devices is a cable comprising 4-wires.

122. A computer network according to claim 96, wherein the human interface is located more than 10 feet from the computing system.

123. A computer network according to claim 96,
wherein the human interface includes a human interface device;
wherein the second interface is operable to receive, from the human interface device, second human interface signals comprising second non-video data to be transmitted to the computing system and is operable to convert the second human interface signals into a format suitable for transmission to the first interface device;
wherein the converted second human interface signals are transmitted to the first interface device via the at transmission medium; and
wherein the first interface device is operable to receive the converted second human interface signals from the second interface device and provide the second human interface signals to the computing system.

124. A computer network according to claim 123,
wherein the human interface device is operable to generate the second human interface signals in a first format suitable for transmission to the computing system; and
wherein the second interface device is operable to convert the second human interface signals into a second format suitable for transmission to the first interface device.

125. A computer network according to claim 124,
wherein the second format is suitable for transmission over distances greater than 10 feet.

126. A computer network according to claim 124,
wherein the first interface device is operable to receive the second human interface signals in the second format and convert the second human interface signals back to the first format suitable for transmission to the computing system.

127. A computer network according to claim 96, wherein the computing systems respectively coupled to each one of at least two nodes are housed together in a common support structure located in a shared computer room.

128. A computer network according to claim 96,
wherein the format is suitable for transmission over distances greater than 10 feet.

* * * * *

UNITED STATES PATENT AND TRADEMARK OFFICE
CERTIFICATE OF CORRECTION

| | | |
|---|---|---|
| PATENT NO. | : 7,043,748 B2 | Page 1 of 1 |
| APPLICATION NO. | : 09/755378 | |
| DATED | : May 9, 2006 | |
| INVENTOR(S) | : Thornton et al. | |

It is certified that error appears in the above-identified patent and that said Letters Patent is hereby corrected as shown below:

Column 25
Line 5, delete "IJ/O device" and substitute -- I/O device --.

Signed and Sealed this

Twenty-second Day of August, 2006

JON W. DUDAS
*Director of the United States Patent and Trademark Office*